United States Patent [19]

Holloway, Jr. et al.

[11] Patent Number: 5,705,055
[45] Date of Patent: Jan. 6, 1998

[54] APPARATUS FOR AUTOMATICALLY RECOVERING GREASE FROM A GREASE SEPARATOR

[75] Inventors: Caswell F. Holloway, Jr., Jupiter Hills, Fla.; Conrad Held, La Porte, Ind.; Thomas Roach, La Porte, Ind.; Roger Mielbeck, La Porte, Ind.

[73] Assignee: Josam Company, Michigan City, Ind.

[21] Appl. No.: 494,628

[22] Filed: Jun. 23, 1995

[51] Int. Cl.$^6$ ............. B01D 17/032; B01D 17/028
[52] U.S. Cl. ............. 210/115; 210/149; 210/187; 210/521; 210/540
[58] Field of Search ............. 210/86, 103, 104, 210/138, 149, 187, 539, 742, 744, 774, 776, 800, 521, 532.1, 538

[56] References Cited

U.S. PATENT DOCUMENTS

| | | |
|---|---|---|
| 1,116,903 | 11/1914 | McClintock. |
| 2,076,380 | 4/1937 | Marsh. |
| 2,090,813 | 8/1937 | Schumacher. |
| 2,284,737 | 6/1942 | Hirshstein ............. 210/539 |
| 2,324,190 | 7/1943 | Bousey ............. 210/539 |
| 2,935,197 | 5/1960 | Marple ............. 210/539 |
| 2,982,414 | 5/1961 | Hirshstein ............. 210/149 |
| 3,804,252 | 4/1974 | Rishel. |
| 4,113,617 | 9/1978 | Bereskin et al. ............. 210/149 |
| 4,145,287 | 3/1979 | Walker et al. ............. 210/104 |
| 4,385,986 | 5/1983 | Jaisinghani et al. ............. 210/123 |
| 4,608,160 | 8/1986 | Zoch ............. 210/115 |
| 4,684,467 | 8/1987 | Cloud. |
| 5,122,280 | 6/1992 | Russell et al. ............. 210/745 |
| 5,178,754 | 1/1993 | Batten et al. ............. 210/138 |
| 5,225,085 | 7/1993 | Napier et al. ............. 210/187 |
| 5,431,826 | 7/1995 | Becker et al. ............. 210/149 |
| 5,492,619 | 2/1996 | Batten ............. 210/86 |

*Primary Examiner*—Joseph W. Drodge
*Attorney, Agent, or Firm*—Tarolli, Sundheim, Covell, Tummino & Szabo

[57] ABSTRACT

An apparatus for separating grease from an effluent stream containing grease and water includes a separation tank, having a separation chamber; in which the grease and water in the effluent separate with the grease floating on top of the water. Grease is heated to a liquid state then pumped from the separation tank when the depth of the grease has reached a predetermined depth below an upper surface of the effluent in the separation tank. The pumping of grease from the separation tank is interrupted after a predetermined period of time. Separated water passes through a relatively low passage to a trap chamber which has a water outlet.

9 Claims, 3 Drawing Sheets

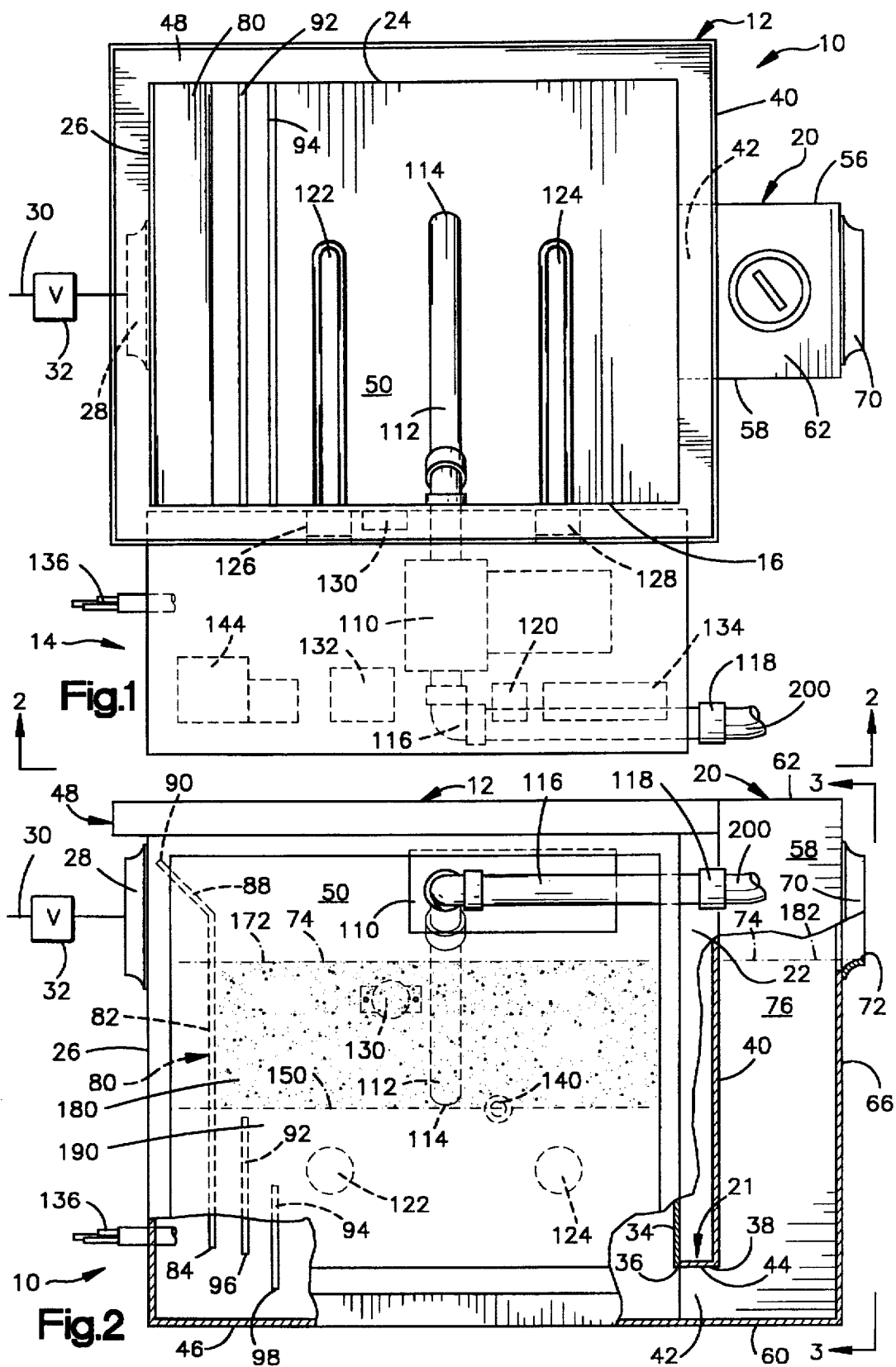

APPARATUS FOR AUTOMATICALLY RECOVERING GREASE FROM A GREASE SEPARATOR

BACKGROUND OF THE INVENTION

The present invention relates to a method and apparatus for automatically recovering grease from a grease separator. In particular, the present invention relates to a method and apparatus for treating, with a grease separator, waste water from restaurants, food processing facilities, and other commercial and industrial operations, and removing automatically the grease components from the grease separator.

It is known to pass the effluent from food processing facilities or other operations through devices for removing grease, to enable the grease to be kept out of a sewage system. Examples of such devices are shown in U.S. Pat. Nos. 5,122,280, 5,178,754, and others. Some of these devices work by skimming grease or oil floating on the surface of a body of water by means of a rotating member which collects the grease or oil and deposits it elsewhere. Other such devices work by flooding off a layer of grease or oil from the top of a body of effluent.

SUMMARY OF THE INVENTION

The present invention relates to separating grease from effluent containing grease and water. The effluent is conducted into a separation tank. In the separation tank, the grease and water in the effluent separate, with the grease floating on the water. When the depth of the grease, as measured from the upper surface of the effluent in the separation tank, reaches a predetermined depth, the water and grease are heated to liquefy the grease. When the grease is liquefied, the grease is pumped from the separation tank. When a predetermined period of time has expired, the pumping of the grease from the separation tank is interrupted.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a top plan view of an automatic draw-off grease interceptor, which is constructed and operated in accordance with the present invention, with its top cover removed;

FIG. 2 is a front elevational view of the interceptor, taken generally along the line 2—2 of FIG. 1;

DESCRIPTION OF A PREFERRED EMBODIMENT OF THE INVENTION

Figure 3:
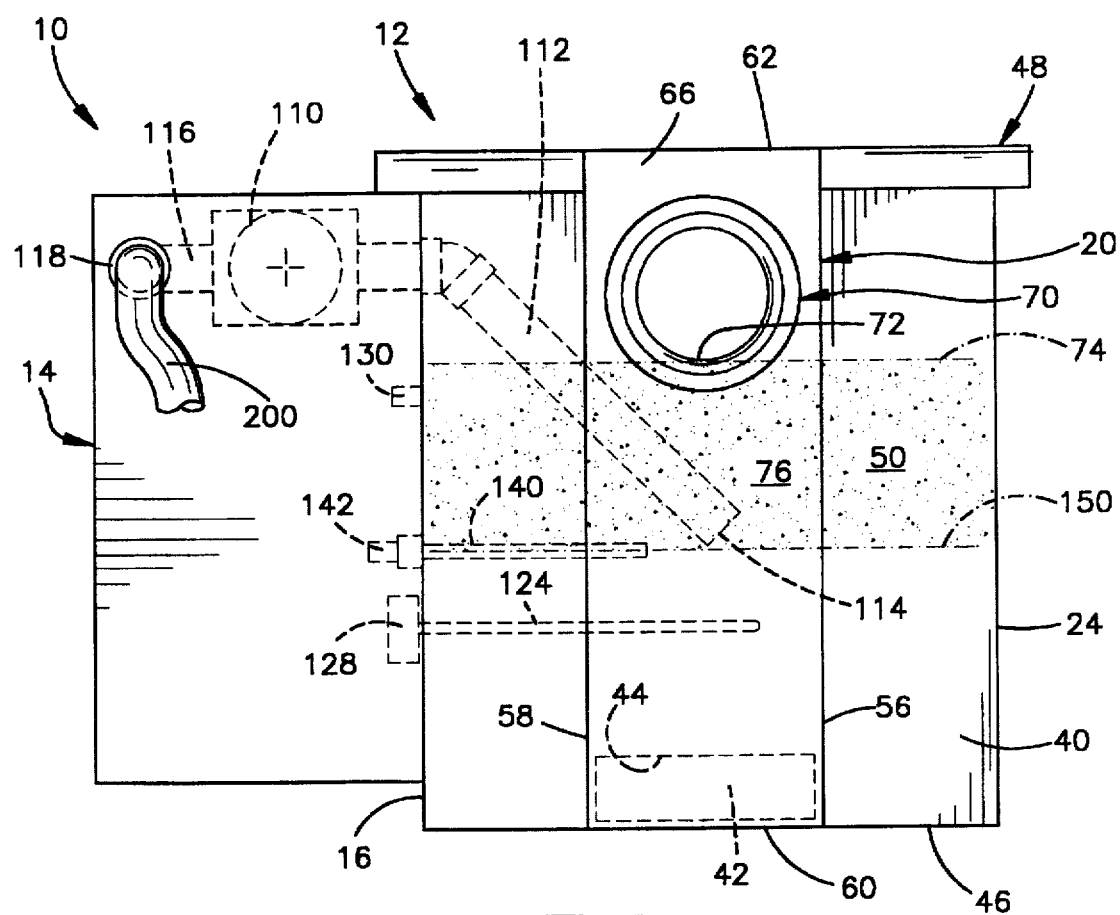
FIG. 3 is a side elevational view of the interceptor, taken generally along the line 3—3 of FIG. 2.

The present invention relates to a method and apparatus for separating grease from effluent containing grease and water. As representative of the present invention, FIG. 1 illustrates an interceptor 10.

The interceptor 10 includes a separation tank 12 and a trap leg 20. An equipment cabinet 14 is connected to the separation tank 12.

The separation tank 12 includes a front wall 16 (FIG. 1) and an opposite back wall 24. An inlet wall 26 interconnects the front and back walls 16 and 24. An inlet 28 extends through the inlet wall 26. At its opposite end the separation tank 12 includes a wall 34 (FIG. 2). The wall 34 has a rectangular opening 36 into the trap leg 20.

The separation tank 12 also has a bottom wall 46 and a removable cover 48. The cover 48 has been removed in FIG. 1 to reveal the interior of the separation tank 12. Together, the walls 16, 24, 26, 34 and 46, and the cover 48, define a separation chamber 50 in the separation tank 12.

The trap leg 20 is a vertically extending rectangular tube which is spaced from the separation tank 12. An open tubular portion 21 projects laterally from the trap leg wall 40 and is welded to the separation tank 12. An open space 22 extends between the separation tank 12 and the trap leg 20 at other locations. The opening 36 in the separation tank wall 34 is aligned with an opening 38 in the tubular portion 21 of the trap leg 20, and together they define an intermediate passage 42 between the separation tank 12 and the trap leg 20. The intermediate passage 42 has an upper edge 44. The intermediate passage 42 provides fluid communication between the separation tank 12 and the trap leg 20. The intermediate passage 42 is disposed below the inlet 20.

The trap leg 20 also includes a back wall 56, a front wall 58, a bottom wall 60, and a top wall 62. An outlet wall 66 of the trap leg 20 is spaced from and extends generally parallel to the wall 40. The walls of the trap leg 20 define a water chamber 76 in the trap leg 20.

An outlet 70 extends through the outlet wall 66. The outlet 70 has a lower edge 72. The lower edge 72 defines a static fluid level 74 which is the same in both the separation tank 12 and the trap leg 20. Water flowing out of the interceptor 10 from the outlet 70 is drained through suitable piping or other means (not shown) into a drain or sewer system.

A plurality of baffles extend between the front and back walls 16 and 24 (FIG. 1) of the separation tank 12. The plurality of baffles include an inlet baffle 80 (FIGS. 1 and 2). The inlet baffle 80 includes a vertical portion 82 having a lower end 84 near the bottom wall 46 of the separation tank 12. The vertical portion 82 of the inlet baffle extends parallel to the inlet wall 26 and perpendicular to the front and back walls 16 and 24. The inlet baffle 80 has an upper end portion 88 extending at an angle from the vertical portion 82 upward and in a direction toward the inlet end wall 26. The inlet baffle upper end portion 88 has an upper end 90 disposed near the upper edge of the interceptor inlet 28.

Two lower baffles 92 and 94 are disposed adjacent to and inward from the lower end 84 of the inlet baffle 80. The lower baffles 92 and 94 have respective lower ends 96 and 98 disposed below the lower end 84 of the inlet baffle 80. The lower end 98 of the baffle 94 is disposed below the upper edge 44 of the intermediate passage 42. Effluent flows upward through the spaces between the parallel baffles 80, 92 and 94. A smaller amount of the effluent flows beneath the lower end of the baffle 94. The baffles 80, 92 and 94 cooperate to produce an upward flow of effluent in the separation tank 12 in a direction away from the intermediate passage 42. The upward flow of effluent induces separation by specific gravity of the components of the effluent entering the separation tank 12, with the less dense components, such as grease, floating on top of the denser components, such as water.

The equipment cabinet 14 is connected with the front wall 16 of the separation tank 12 in a manner so as to provide a dry environment for the equipment therein. Depending on installation requirements, an optional removable top cover may be provided for top access to the equipment cabinet 14. An electrically actuated pump 110 is disposed in the equipment cabinet 14. A suction conduit 112 extends from the pump 110 through the separation tank front wall 16 into the separation tank 12. The suction conduit 112 has an inlet end portion 114 disposed above the upper edge 44 of the intermediate passage 42.

A pump outflow conduit 116 extends from the pump 110 and terminates in a pump outlet 118. The pump outlet 118 is connected with an outflow hose 200 for grease which is suctioned through the pump 110. A pump solenoid 120 which is in the control circuit for the pump 110 is disposed in the equipment cabinet 14.

A pair of heaters 122 and 124 extend from the separation tank front wall 16 into the separation tank 12. The heaters 122 and 124 are disposed below the inlet end 114 of the pump suction conduit 112. The heaters 122 and 124 are preferably electrical resistance heaters. When the level of grease in the separation tank 12 reaches a low point on a signal probe 140, in a manner as described below, the heaters 122 and 124 are supplied with electric current through suitable connectors 126 and 128 to energize the heaters to heat the effluent within which the heaters are disposed. A temperature sensor 130 and a temperature reader solenoid 132 are also part of the control circuitry for the heaters 122 and 124. The heaters 122 and 124 heat the effluent to a temperature greater than the temperature at which the grease in the effluent solidifies. It should be understood that heaters of a type other than electrical resistance heaters may be used.

In the separation tank 12, the grease separates from the water in the effluent. Since the grease is lighter than the water, the grease floats on the water. This results in the liquid in the separation tank 12 constituting a layer of grease floating on a body of water. The thickness of the layer of grease, that is, the depth of the grease, is measured downward from the upper surface of the effluent in the separation tank 12 to a boundary between a body of grease in the upper portion of the separation tank and a body of water in a lower portion of the separation tank.

The interceptor 10 includes a grease depth signal probe 140 (FIG. 3). The grease depth signal probe 140 extends horizontally into the separation tank 12, from the tank front wall 16. A grease probe reader 144 (FIG. 1) is electrically connected with the grease depth signal probe 140 (FIG. 3) by an electrical connector 142. The grease depth signal probe 140 senses the electrical resistance of fluid surrounding the probe, and differentiates on that basis between grease (or oil) and water. The vertical position of the grease depth signal probe 140 in the separation tank 12 defines a rated grease depth level 150 in the separation tank 12.

A programmable controller 134 is electrically connected with the temperature sensor 130, with the temperature reader solenoid 132, and with the heaters 122 and 124. The programmable controller 134 is also electrically connected with the pump 110 and with the pump solenoid 120. The programmable controller 134 is also electrically connected with the grease depth signal probe 140 and with the grease probe reader 144.

The programmable controller 134 controls the operation of the heaters 122 and 124, and the pump 110, in response to signals received from sensors including the grease depth signal probe 140. The programmable controller 134 and the other electrically operated components of the interceptor 10 are supplied with electric current through an electrical wiring harness 136.

To prevent outflow of grease during initial setup of the interceptor 10, the interceptor is initially filled with clean water, that is, water not having any significant grease content. Clean water is supplied through the inlet 28. The water flowing into the separation tank 12 contacts the inlet baffle 80 and flows downward, past the lower end 84 of the inlet baffle 80, to the bottom wall 46 of the separation tank 12. As more water enters through the inlet 28, the separation tank 12 fills with water. The lower baffles 92 and 94 help to stabilize the flow of water within the separation tank 12.

As the separation tank 12 fills, water also flows from the separation tank through the intermediate passage 42 into the trap leg 20. The upper surface of the body of water in the trap leg 20 is at the same level as the upper surface of the body of water in the separation tank 12. The two bodies of liquid, which are interconnected through the intermediate passage 42, form one continuous body of liquid.

As more water enters through the inlet 28, the level of water in the separation tank 12 continues to rise. As the water level rises, the grease depth level probe 140 is submerged. When the probe 140 is submerged, it signals the programmable controller 134 to reset its operative cycle.

The upper surface of the water in the separation tank 12 rises until it reaches the lower edge 72 of the interceptor outlet 70 in the trap leg 20. The water begins to flow out of the interceptor 10. The interceptor 10 is, at this point, filled with clean water, in both the separation tank 12 and the trap leg 20. The two bodies of liquid have the same level, which is the static level 74.

The effluent which is to be cleaned is then allowed to flow into the interceptor 10 through the inlet 28. The effluent flowing into the separation tank 12 contacts the inlet baffle 80 and flows downwardly, past the lower end 84 of the inlet baffle and toward the bottom wall 46 of the separation tank 12. The effluent mixes with the water already in the separation tank 12.

The grease component of the effluent in the separation tank 12 floats to the top of the body of liquid in the separation tank. This forms what is initially a thin layer of grease on top of a relatively thick layer of water. The grease forms at least a portion of the upper surface 172 of the effluent in the separation tank 12. The layer of grease, at its maximum depth, is designated 180 in FIGS. 2 and 3 and indicated by stippling. The layer of water is designated 190. The boundary between this thin layer of grease and the layer of water is disposed above the upper edge 44 of the intermediate passage 42. Thus, the grease remains in the separation tank 12 and does not flow into the trap leg 20.

As effluent flows into the separation tank 12 through the inlet 28, the total volume of liquid in the separation tank increases. This tends to raise the level of the upper surface of the bodies of liquid in the separation tank 12 and in the trap leg 20, to a level above the static level 74. This causes a volume of liquid to flow out of the trap leg 20 through the interceptor outlet 70. The liquid which flows out of the trap leg 20 through the interceptor outlet 70 is clean water, because no grease has entered the trap leg. Simultaneously, an identical volume of liquid flows from the separation tank 12 through the intermediate passage 42 and into the trap leg 20. The liquid which flows from the separation tank 12 through the intermediate passage 42 and into the trap leg 20 is also clean water, because the boundary between the grease layer 180 and the water layer 190 is above the intermediate passage.

As more effluent flows into the separation tank 12, the thickness of the grease layer 180 in the separation tank 12 increases. That is, the depth of the grease layer 180 as measured downward from the upper surface of the body of fluid in the separation tank 12, increases. The boundary between the layer of grease and the layer of water 190 moves downward, away from the static level 74 in a direction toward the rated grease depth level 150.

As this increase in the thickness or depth of the grease layer 180 occurs, the body of fluid in the trap leg 20, which has an upper surface 182 formed by water, remains as only water. This is because only water flows into the trap leg chamber 76 through the intermediate passage 42. The upper surface 182 of the body of chamber in the trap leg chamber 76 remains at the same level as the upper surface 172 of the body of effluent, including grease and water, in the separation tank 12. Both are at the static level 74 which is defined by the lower edge 72 of the interceptor outlet 70.

The grease and water separation process is preferably a continuous process, rather than a batch process. Thus, while the inlet 28 is open to enable flow of effluent into the separation tank 12, grease and water in the effluent separate within the separation tank 12; water flows from the separation tank into the trap leg 20; and water flows out of the trap leg and thus out of the interceptor 10 from the outlet 70. While the inlet 28 and the outlet 70 have the same surface area, the intermediate passage 42 is larger in surface area to allow this continuous flow.

As more grease collects in the separation tank 12, the depth of the layer of grease 180 increases. When the depth of the grease layer 180 reaches the rated grease depth level 150, as illustrated in FIG. 2, the electrical resistivity of the fluid surrounding the grease depth level signal probe 140 changes. The grease depth level signal probe 140 senses the presence of grease and not water. This occurs when the boundary between the grease layer 180 and the water layer 190 in the separation tank 12 moves downward to the rated grease depth level 150.

The grease depth signal probe 140 then outputs an appropriate signal to the programmable controller 134. The programmable controller 134 actuates an electric alarm which signals the operator to stop the flow of effluent into the interceptor 10. After a predetermined period of time, the heaters 122 and 124 are actuated to heat the body of liquid in the separation tank 12. The temperature sensor 130 is disposed near the static level 74 and thus is normally exposed to the layer of grease in the chamber 50. The heaters 122 and 124 heat the water layer 190 of the body of liquid in the chamber 50 in the separation tank 12.

As the water is heated, so also the layer of grease 180 on top of the water is heated, and the grease is liquified so that it can be pumped out by the pump 110. When the temperature sensor 130 senses that the temperature of the layer of grease is such that the grease is liquefied, i.e., at about 140° F., the temperature sensor signals the programmable controller 134 to turn off the heaters 122 and 124. Another alarm is also sounded, to indicate the beginning of the pumping process.

The pump 110 is then turned on in response to a signal from the programmable controller 134. Grease is pumped out of the separation tank 12 of the interceptor 10. The grease is suctioned into the pump inlet 114 and through the suction conduit 112 to the pump 110. The grease is then pumped through the pump outflow conduit 116 and the pump outlet 118. The grease exits the interceptor 10 through the outlet hose 200. The grease is then stored or transported elsewhere in an appropriate manner, as discussed in detail below.

During the time period when grease is being pumped out of the separation tank 12, the upper surface of the body of liquid in the separation tank 12 falls. This is because no effluent is entering the separation tank 12. The upper surface of the body of water in the water chamber 76 in the trap leg 20 also drops as water therefrom flows back into the separation tank 12.

The pump 110 remains actuated for a predetermined period of time. This predetermined period of time is selected to be long enough to pump all or substantially all of the grease layer out of the separation tank 12, dependent on the capacity of the pump 110 and the volume of the separation tank 12. When the predetermined period of time expires, the programmable controller 134 turns off the pump 110 to interrupt pumping of grease from the interceptor 10.

The programmable controller 134 also actuates a suitable visual or audible signal so that the operator can resume the flow of effluent through the inlet 28. The level of effluent in the separation tank 12 and the trap leg 20, again rises. As the level of liquid in the separation tank 12 increases, the grease depth level probe 140 is submerged with clear water and signals the computer to reset its operative cycle again.

The interceptor 10 may also be operated by allowing some effluent to continue to flow into the separation tank 12 through the inlet 28 while grease is being heated by the heaters 122 and 124 and then pumped out by the pump 110. In this case, because effluent continues to flow into the separation tank 12 while grease is being heated, the heating portion of the cycle takes longer than if the inlet flow is stopped during the cycle.

Figure 4:
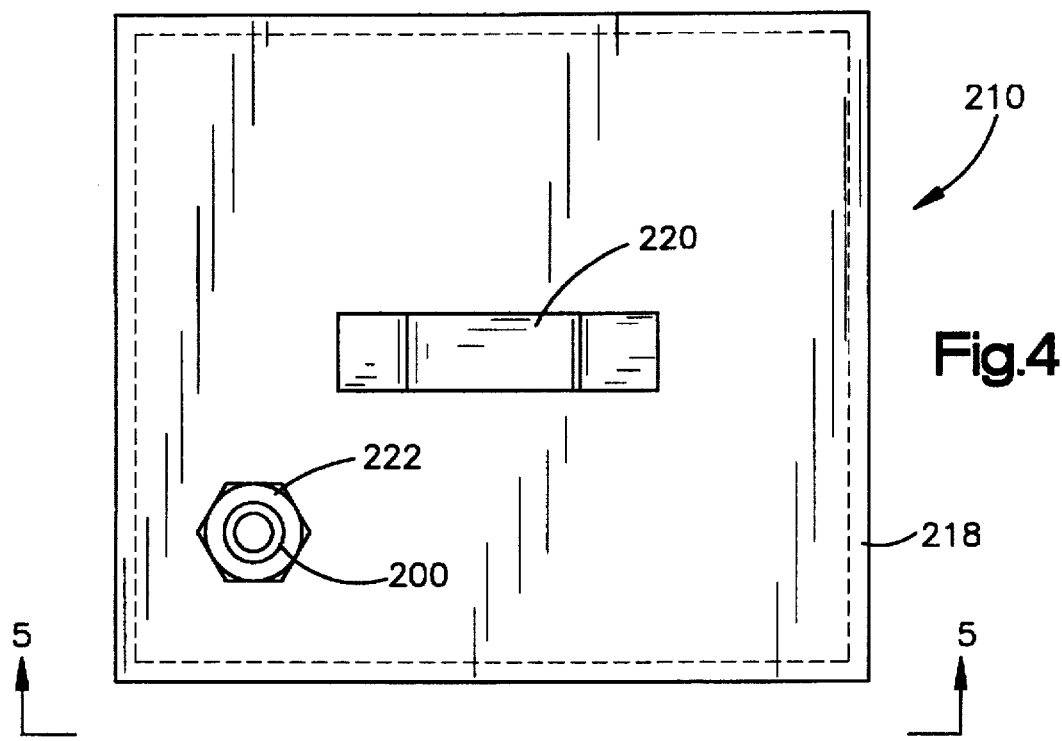
FIG. 4 is a top plan view of a reclaim container for use with the interceptor of FIG. 1.
Figure 5:
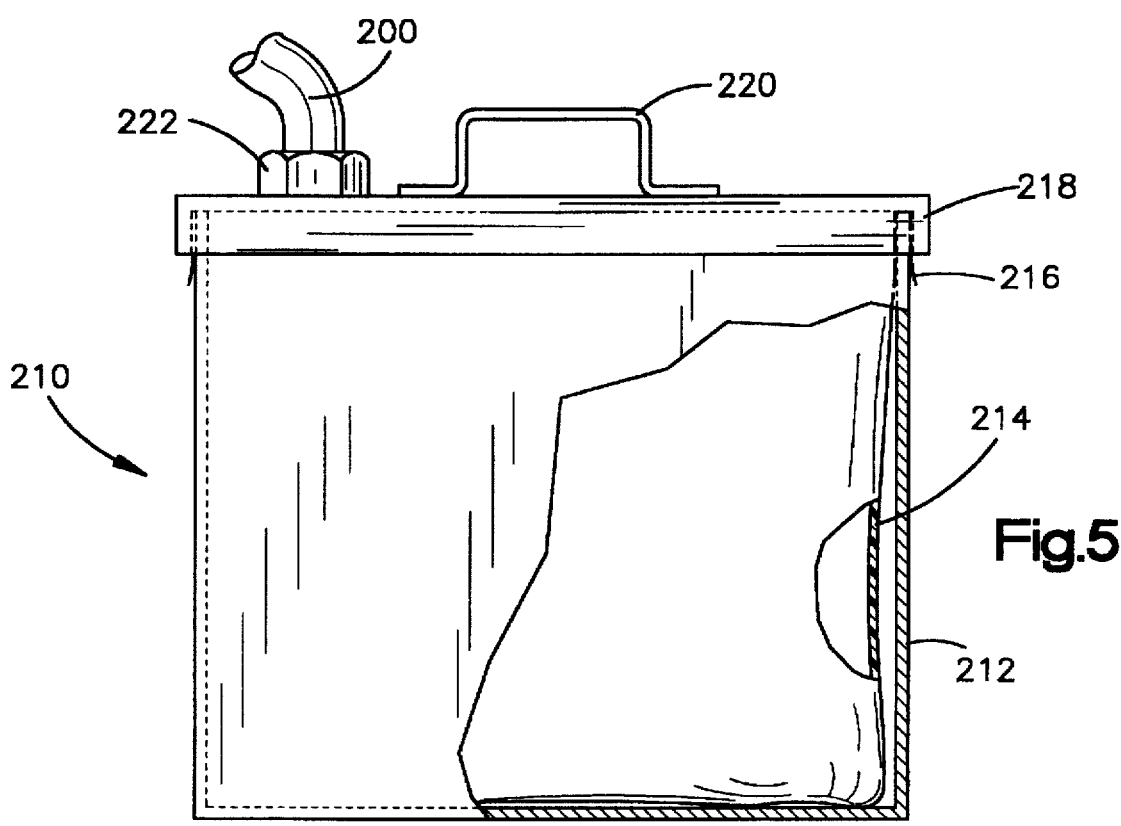
FIG. 5 is a side view partly in section of the reclaim container of FIG. 4.

The grease which is pumped out of the interceptor 10 through the outlet hose 200 is preferably collected in a container such as the reclaim container 210 illustrated schematically in FIGS. 4—5. The reclaim container 210 includes a tank 212 which is preferably made from metal but could also be made from plastic. The tank 212 is generally cubical in configuration and may, for example, be about 14" on a side. The tank 212 is open at the top to receive grease from the interceptor 10.

A disposable liner 214 is located within the tank 212. The liner 214 is preferably made from a heavy plastic material which is capable of sustaining the relatively high temperatures, about 140° F., of the grease which is removed from the interceptor 10, and which is strong enough to handle the weight of the grease. An edge portion 216 of the liner 214 extends outward of the tank 212 for ease of removal.

The reclaim container 210 includes a top 218 which is also preferably made from metal or plastic. The top 218 has a handle 220. A hose or pipe connector 222 projects upwardly from the top 218. The outlet hose 200 is attached to the connector 222.

Grease which is pumped out of the interceptor 10, in a manner as described above, flows through the hose 200 and into the liner 214 in the tank 212. The grease collects in the liner 214. When the liner 214 has received the capacity of one pumping cycle, the top 218 is removed, and the liner is removed from the tank 212 for appropriate disposal. A new liner 214 is placed in the tank 212. The reclaim container 210 is then ready for use again.

The dimensions of the reclaim container 210 are preferably selected so as to provide sufficient capacity to store all the grease which is pumped out of the interceptor 10 in one pumping cycle. An optional sensor such as a liquid level sensor may be placed in the reclaim container 210 to indicate that the liner 214 is full and ready to be changed.

From the above description of the invention, those skilled in the art will perceive improvements, changes and modifications in the invention. For example, an optional fluid inlet line, indicated schematically at 30, may be connected in fluid communication with the inlet 28. An optional electrically actuated control valve 32 may be disposed in the inlet line 30. The valve 32 can be controlled by the programmable controller 134 to be closed when the heating and pumping process is commenced and opened when the pumping process is completed. Also, an optional fail safe liquid level sensor may be incorporated in the separation tank 12 below the level of the probe 140, so that the quantity of grease in the tank 12 (above the optional sensor) does not exceed the capacity of the separator 10. This will cause a steady alarm to sound indicating that immediate attention is needed. Such improvements, changes and modifications within the skill of the art are intended to be covered by the appended claims.

We claim:

1. An automatic draw-off grease interceptor for removing grease from an effluent stream containing grease and water, comprising:

a separation tank defining a separation chamber and a trap leg defining a water chamber;

an effluent inlet connected with said separation tank for permitting flow of the effluent stream into the separation chamber;

a water outlet connected with said trap leg for permitting flow of water from the water chamber;

an intermediate passage extending between said separation chamber and said water chamber at a level below said effluent inlet and said water outlet, for passing water from said separation chamber into said water chamber;

a pump for pumping grease from said separation chamber, said pump having a pump inlet in said separation chamber at a level below said effluent inlet and above said intermediate passage;

a sensor operative for sensing the presence of a thickened layer of grease at a predetermined level above said intermediate passage; and means responsive to said sensor for actuating said pump to pump grease out of the separation chamber to block the formation of a layer of grease at a level below the predetermined level, said intermediate passage having an upper edge disposed below said predetermined level thereby to block flow of grease from said separation chamber into said water chamber.

2. An interceptor as set forth in claim 1 further comprising a plurality of baffles which cooperate to produce an upward flow of effluent in said separation chamber in a direction away from said intermediate passage, thereby to induce separation by specific gravity of the components of the effluent entering said separation chamber with grease being disposed above said predetermined level in said separation chamber and water being disposed below said predetermined level in said separation chamber, said water chamber in said trap leg being free of grease.

3. An interceptor as set forth in claim 2 wherein said water outlet has a lower edge which defines a static fluid level which is the same in both said separation chamber and said water chamber.

4. An interceptor as set forth in claim 1 further comprising at least one heater which extends into said separation chamber below said pump inlet for heating the effluent within which said heater is disposed, and a temperature sensor electrically connected with said heater for controlling operation of said heater, said heater being operative to heat the effluent to a temperature greater than the temperature at which the grease in the effluent solidifies.

5. An interceptor as set forth in claim 4 wherein said sensor comprises an electrically operated grease depth signal probe whose vertical position in said separation chamber defines a rated grease depth level in said separation chamber.

6. An interceptor as set forth in claim 5 wherein said means for actuating said pump comprises a programmable controller electrically connected with said temperature sensor and with said heater and with said pump and with said grease depth signal probe.

7. An interceptor as set forth in claim 6 wherein said grease depth signal probe is operative to output a signal to said programmable controller in response to sensing the presence of a layer of grease at said predetermined level above said intermediate passage, said programmable controller being responsive to said signal to actuate said heater to heat the effluent in said separation chamber.

8. An interceptor as set forth in claim 7 wherein said temperature sensor is operative to signal said programmable controller to turn off said heater when said temperature sensor senses that the temperature of the effluent is such that the grease is liquefied.

9. An interceptor as set forth in claim 5 wherein said means for actuating said pump comprises means for actuating said pump in response to a signal from said programmable controller for a predetermined period of time selected to be long enough to pump all or substantially all of the grease layer out of said separation chamber, said programmable controller turning off said pump to interrupt pumping of grease from said separation chamber at the end of said predetermined period of time.

* * * * *